US009290207B2

(12) United States Patent  (10) Patent No.: US 9,290,207 B2
Cho et al.  (45) Date of Patent: Mar. 22, 2016

(54) STRUCTURE OF ENGINE ROOM

(71) Applicant: Hyundai Motor Company, Seoul (KR)

(72) Inventors: Hyun Cho, Seoul (KR); Joon-Ho Lee, Seoul (KR); Jong-Woo Nam, Seoul (KR); Han-Shin Chung, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/140,423

(22) Filed: Dec. 24, 2013

(65) Prior Publication Data

US 2015/0061325 A1  Mar. 5, 2015

(30) Foreign Application Priority Data

Aug. 30, 2013  (KR) .......................... 10-2013-0103590

(51) Int. Cl.
*B60R 7/08* (2006.01)
*B60R 7/04* (2006.01)
*B62D 25/08* (2006.01)

(52) U.S. Cl.
CPC ............ *B62D 25/085* (2013.01); *B62D 25/082* (2013.01)

(58) Field of Classification Search
CPC ........................... B62D 25/085; B62D 25/082

USPC .............. 296/193.09, 187.01, 193.04, 203.01
See application file for complete search history.

(56) References Cited

U.S. PATENT DOCUMENTS

| 5,106,148 | A * | 4/1992 | Ikeda et al. .............. 296/203.02 |
| 7,188,892 | B2 * | 3/2007 | Tazaki et al. ............. 296/193.09 |
| 7,267,394 | B1 * | 9/2007 | Mouch et al. ............ 296/203.02 |

FOREIGN PATENT DOCUMENTS

| JP | 2003-118640 A | 4/2003 |
| KR | 10-2010-0087478 A | 8/2010 |
| KR | 10-2011-0054941 A | 5/2011 |
| KR | 10-2013-0061317 A | 6/2013 |

* cited by examiner

*Primary Examiner* — Joseph D Pape
*Assistant Examiner* — Dana Ivey
(74) *Attorney, Agent, or Firm* — Morgan, Lewis & Bockius LLP (57) ABSTRACT

A structure of an engine room includes an FEM (front end module) disposed at a front side, a dash panel disposed at a rear side, and housing panels disposed at both lateral sides between the FEM and the dash panel, respectively. The structure may include a housing member including a transverse portion which is disposed to be substantially parallel to the dash panel, and longitudinal portions which are bent forward from both ends of the horizontal portion, respectively, and disposed side-by-side with the corresponding housing panels. The housing member is formed with an open interior.

5 Claims, 8 Drawing Sheets

A-A CROSS SECTION

FIG. 6

B-B CROSS SECTION

FIG. 7

C-C CROSS SECTION

*FIG. 8*

D-D CROSS SECTION

STRUCTURE OF ENGINE ROOM

CROSS-REFERENCE TO RELATED APPLICATIONS

The present application claims priority of Korean Patent Application Number 10-2013-0103590 filed on Aug. 30, 2013, the entire contents of which application are incorporated herein for all purposes by this reference.

BACKGROUND OF INVENTION

1. Field of Invention

The present invention relates to an engine room in a vehicle, and more particularly, to a structure of an engine room which is capable of modularizing and assembling a wiring harness, an air conditioner pipe, an electronic stability control (ESC) tube, and the like, which are installed in an engine room, and has a housing member in order to improve rigidity of a vehicle body.

2. Description of Related Art

An engine room in a vehicle refers to a space that is provided to mount an engine and a transmission in a vehicle body. In a general engine room in a passenger vehicle, a carrier of a front end module (hereinafter, referred to as FEM) to which a radiator is mounted is disposed at a front side, a dash panel, which forms a boundary with a driver seat, is disposed at a rear side, and housing panels to which shock absorbers are mounted are disposed at both lateral sides, respectively.

Figure 1:
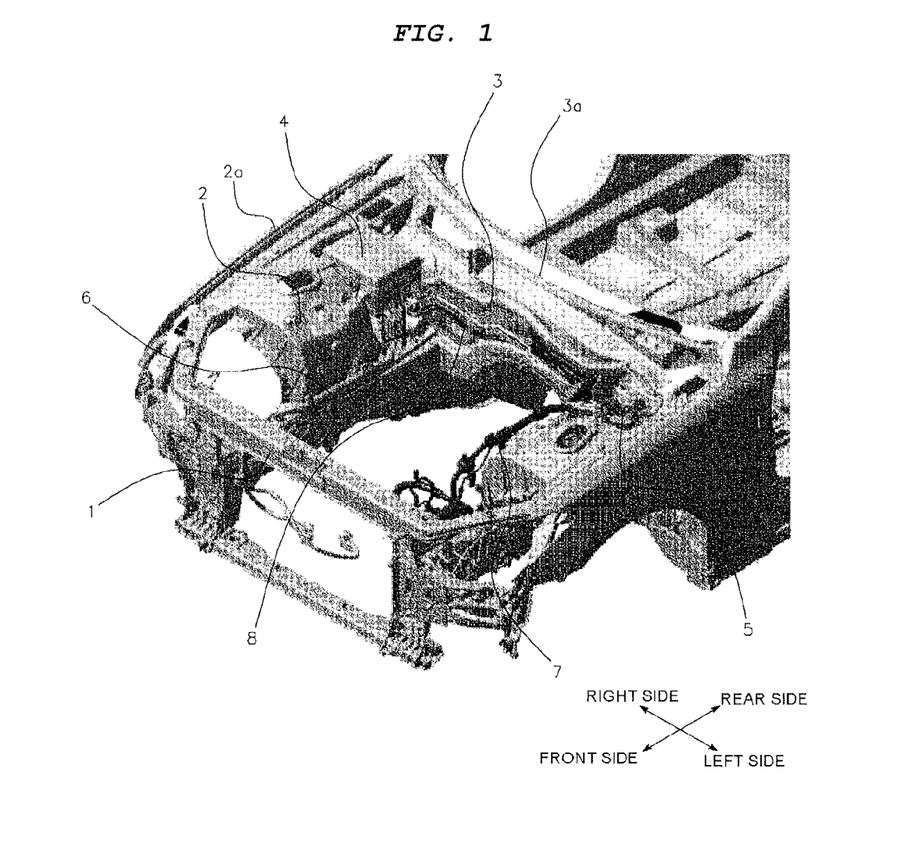
FIG. 1 is a view illustrating an interior of an engine room of the related art.

In addition to the engine and the transmission, a steering system, an air conditioning system, and various electrical components, which accompany the steering system and the air conditioning system, are also mounted in the engine room. That is, as illustrated in FIG. 1, a wiring harness 6, an air conditioner pipe 7, an ESC tube 8, a junction box 4, a starting motor 5, and the like are positioned in the engine room. The aforementioned components are mounted by means of holes punched in the vehicle body, respectively.

That is, in order to assemble the aforementioned components to the vehicle body, multiple holes having various sizes need to be punched in an FEM 1, a dash panel 3, a cowl panel 3a disposed on the dash panel, a fender apron 2a, a housing panel 2 of a shock absorber, and the like, which are disposed in the vicinity of the engine room. The punching of holes may weaken rigidity of the vehicle body, and degrade NVH (noise, vibration, and harshness) performance.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a structure of an engine room which may implement modularization of components so that numerous components may be mounted in an engine room in a short time by a single process, improve production efficiency by reducing the number of assembling processes, and improve rigidity of a vehicle body and NVH performance by reducing the number of holes punched in the vehicle body.

Various aspects of the present invention provide a structure of an engine room in which an FEM is disposed at a front side, a dash panel is disposed at a rear side, and housing panels are disposed at both lateral sides between the FEM and the dash panel, respectively. The structure may include a housing member including a transverse portion which is disposed to be substantially parallel to the dash panel, and longitudinal portions which are bent forward from both ends of the horizontal portion, respectively, and disposed side-by-side with the corresponding housing panels, wherein the housing member is formed with an open interior.

The housing member may be formed by coupling a support panel which has a transverse portion and a longitudinal portion and is disposed at a lower side, with a covering member which has a transverse portion and a longitudinal portion and is seated on the support panel.

In the present invention, the support panel may have a shape opened upward and have a first protruding portion that protrudes on an inner circumferential surface of the support panel, and the covering member may have a size that allows the covering member to be seated on the support panel, have a shape opened downward, and have a second protruding portion that protrudes on an outer circumferential surface of the covering member, wherein when the covering member is to be seated on the support panel, at least one of the support panel and the covering member is elastically deformed so that the second protruding portion is lowered while passing over the first protruding portion.

Box-shaped mounting portions, which are opened upward, may be formed at both sides of the transverse portion of the support panel, respectively, so that a junction box and an engine starting motor are seated on the mounting portions. Enlarged portions, which are seated on the mounting portions, may be formed at both sides of the covering member, respectively, so that wires, which are connected to the junction box and the engine starting motor, are embedded in the housing member. The housing member is horizontally disposed, and in order to improve mounting convenience, brackets on which the support panel may be seated are mounted to the housing panels and the dash panel.

The structure of the present invention, which is configured herein, has the "U"-shaped housing member having an open interior such that a wiring harness and pipes which are mounted to a vehicle may be loaded in the housing member, thereby simplifying a process of assembling components. Further, the number of holes formed in a vehicle body is reduced, thereby improving rigidity of the vehicle body, and NVH performance.

The housing member of the present invention is configured so that the support panel and the covering member are separable in up and down directions, thereby improving assembly convenience, and easily replacing loaded components.

The support panel has the box-shaped mounting portions formed at both sides thereof, thereby easily coupling the junction box and the starting motor. Further, the covering member has the enlarged portions, thereby accommodating wires, which are connected to the junction box and the starting motor, in the enlarged portions.

The support panel and the covering member of the present invention are coupled by engaging the first protruding portion and the second protruding portion with each other while one of the support panel and the covering member is elastically deformed, thereby easily disassembling and assembling the support panel and the covering member.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
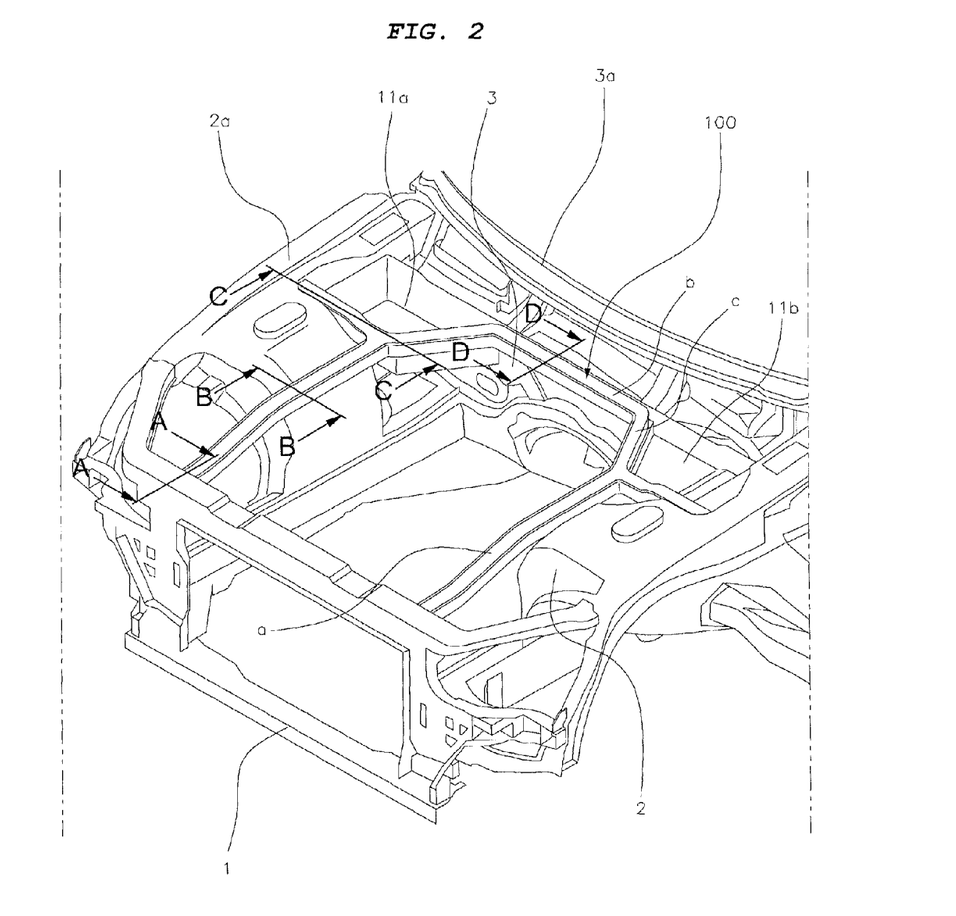
FIG. 2 is a view illustrating an exemplary structure in which a housing member is mounted in an engine room in accordance with the present invention.
Figure 3:
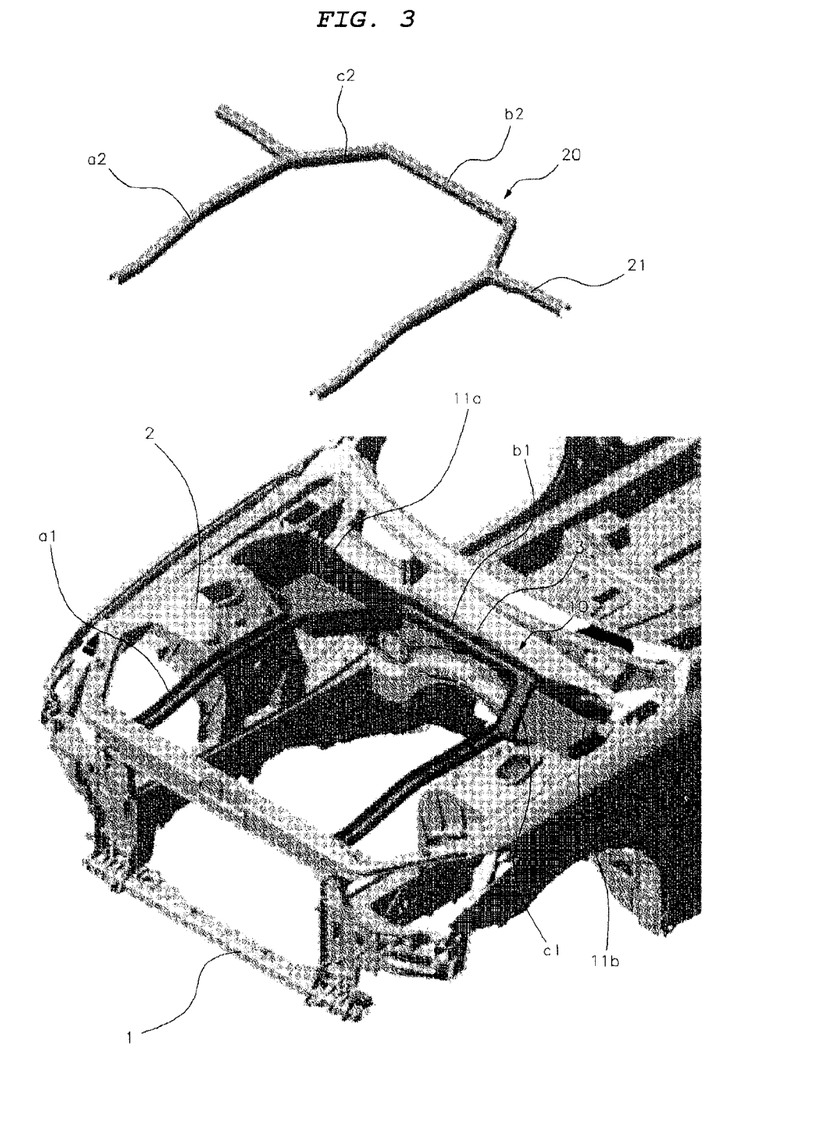
FIG. 3 is a view illustrating an exemplary structure before a covering member is coupled on a support panel in a state in which the support panel is coupled in the engine room.

Referring to FIGS. 2 and 3, in a structure of an engine room according to the present invention, an FEM 1 is disposed at a front side, a dash panel 3 is disposed at a rear side, housing panels 2 to which shock absorbers are coupled are disposed at both lateral sides between the FEM 1 and the dash panel 3, respectively, and a housing member 100 having a pipe shape, which in some cases is bent in a "U" shape, is mounted.

The housing member of the present invention includes a horizontal or transverse portion b which is disposed to be parallel or substantially parallel to the dash panel 3 that is disposed at the rear side of the engine room, and vertical or longitudinal portions a which are bent forward from both ends of the horizontal or transverse portion b, extended up to the FEM 1, and disposed side-by-side with both the housing panels 2, respectively. Further, bent portions c, which are bent at a predetermined angle, are additionally formed between the horizontal or transverse portion b and the vertical or longitudinal portions a, and mounting portions 11 (11a and 11b), which have a box shape and are opened upward so that a junction box 30 and a starting motor 40 are seated thereon, are formed at both sides of the bent portions c.

Enlarged portions 21, which are seated on the mounting portions 11a and 11b, are formed at both sides of a covering member 20 so that wires, which are connected to the junction box 30 and the starting motor 40 of an engine, are embedded in the housing member. That is, in the housing member according to the present invention, a support panel 10 and the covering member 20 are formed to have corresponding horizontal or transverse portions b1 and b2, vertical or longitudinal portions a1 and a2, and bent portions c1 and c2, respectively, the mounting portions 11a and 11b are formed at the support panel 10, and the enlarged portions 21 are formed at the covering member 20.

In the present invention, in order to easily assemble components (a wiring harness, an ESC tube, and the like) that are embedded in the engine room, the support panel 10 and the covering member 20 are separably coupled to each other. As illustrated in FIG. 3, in the housing member, the covering member 20 is detachably coupled on the support panel 10 in a state in which the support panel 10 is fixed in a vehicle body.

Figure 4:
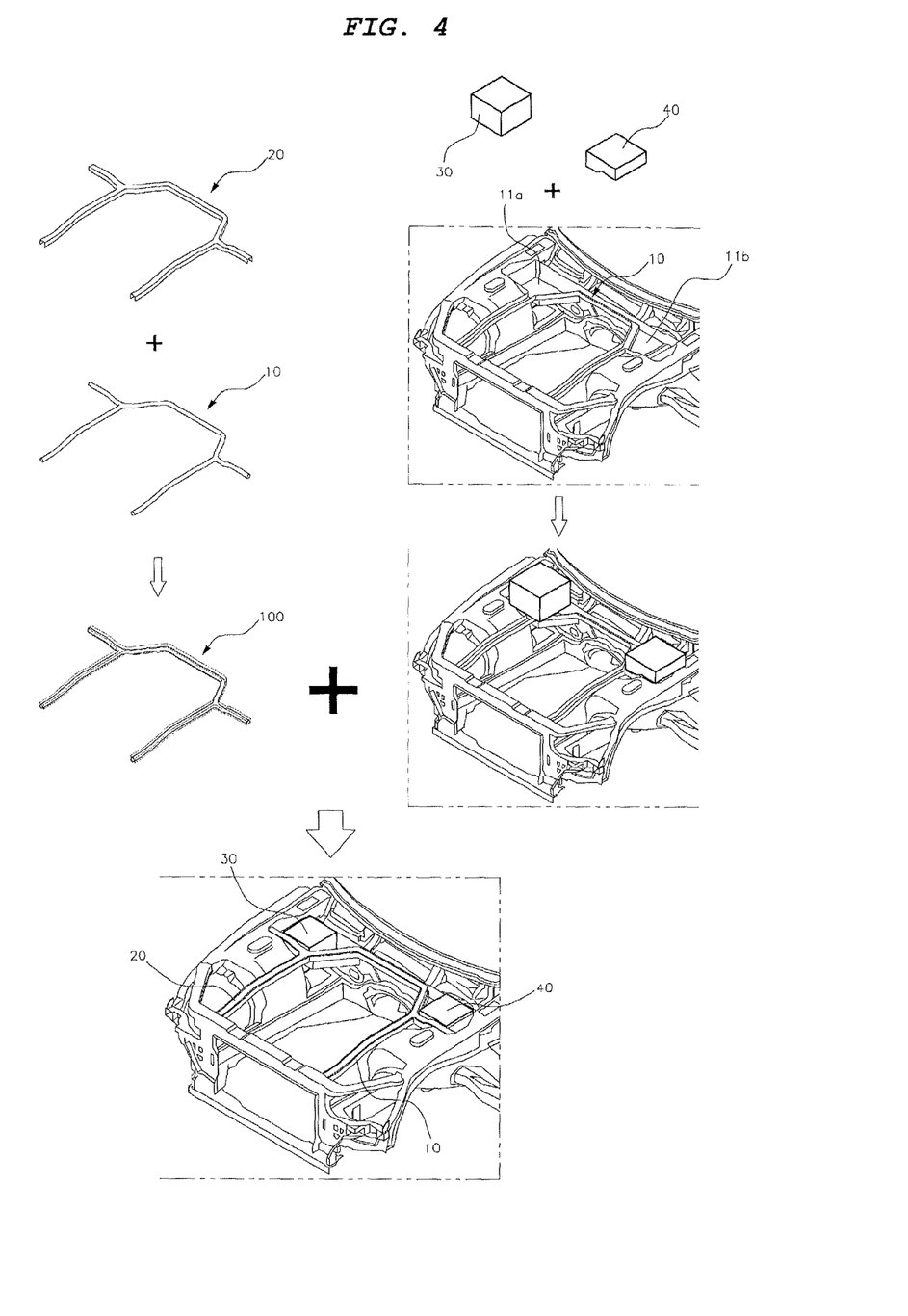
FIG. 4 is a view illustrating an exemplary structure in which the covering member, to which a wiring harness is coupled, is coupled to the support panel in a state in which a junction box and a starting motor are seated on the support panel.

Referring to FIG. 4, in the housing member of the present invention, when the junction box 30 and the starting motor 40 are mounted on the mounting portions 11a and 11b, respectively, in a state in which the support panel 10 is mounted in the vehicle body, the covering member 20 to which the wiring harness 20a together with the ESC tube and the like are coupled is seated on and coupled to the support panel 10.

In various exemplary embodiments of the present invention, (as more clearly illustrated in FIG. 6), the support panel 10 has a shape opened upward, and has first protruding portions 12 that protrude on an inner circumferential surface of the support panel 10, and the covering member 20 has a size that allows the covering member 20 to be seated on the support panel 10, has a shape opened downward, and has second protruding portions 22 that protrude on an outer circumferential surface of the covering member 20. Further, when the covering member 20 is seated on the support panel 10, at least one of the support panel 10 and the covering member 20 is elastically deformed so that the second protruding portions 22 are lowered while passing over the first protruding portions 12.

Figure 5:
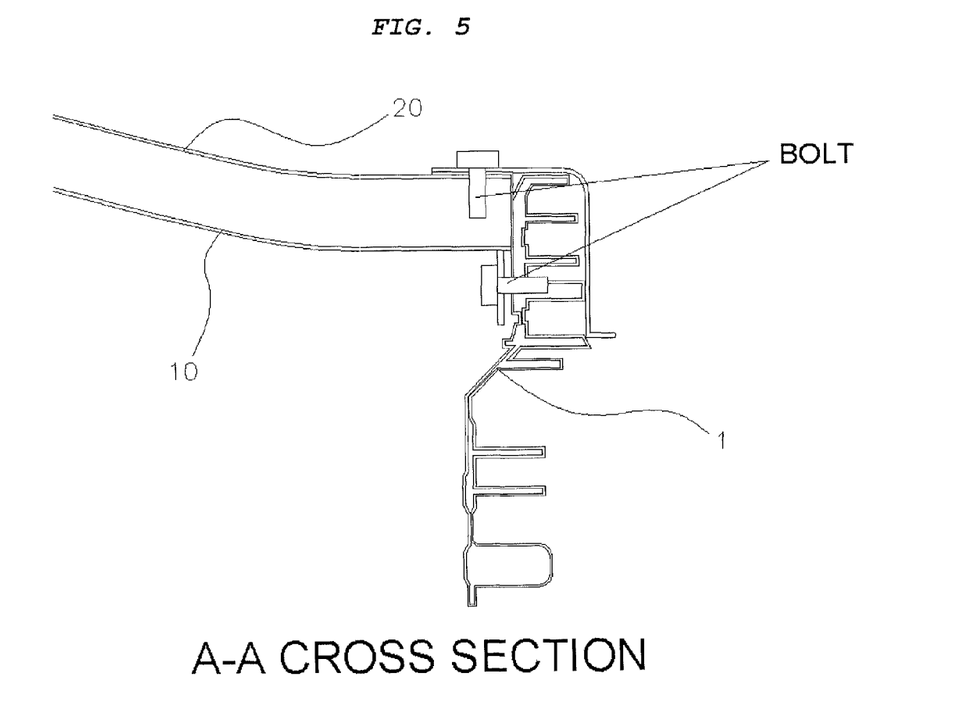
FIG. 5 is a view illustrating a cross section taken along line A-A of FIG. 2.
Figure 6:
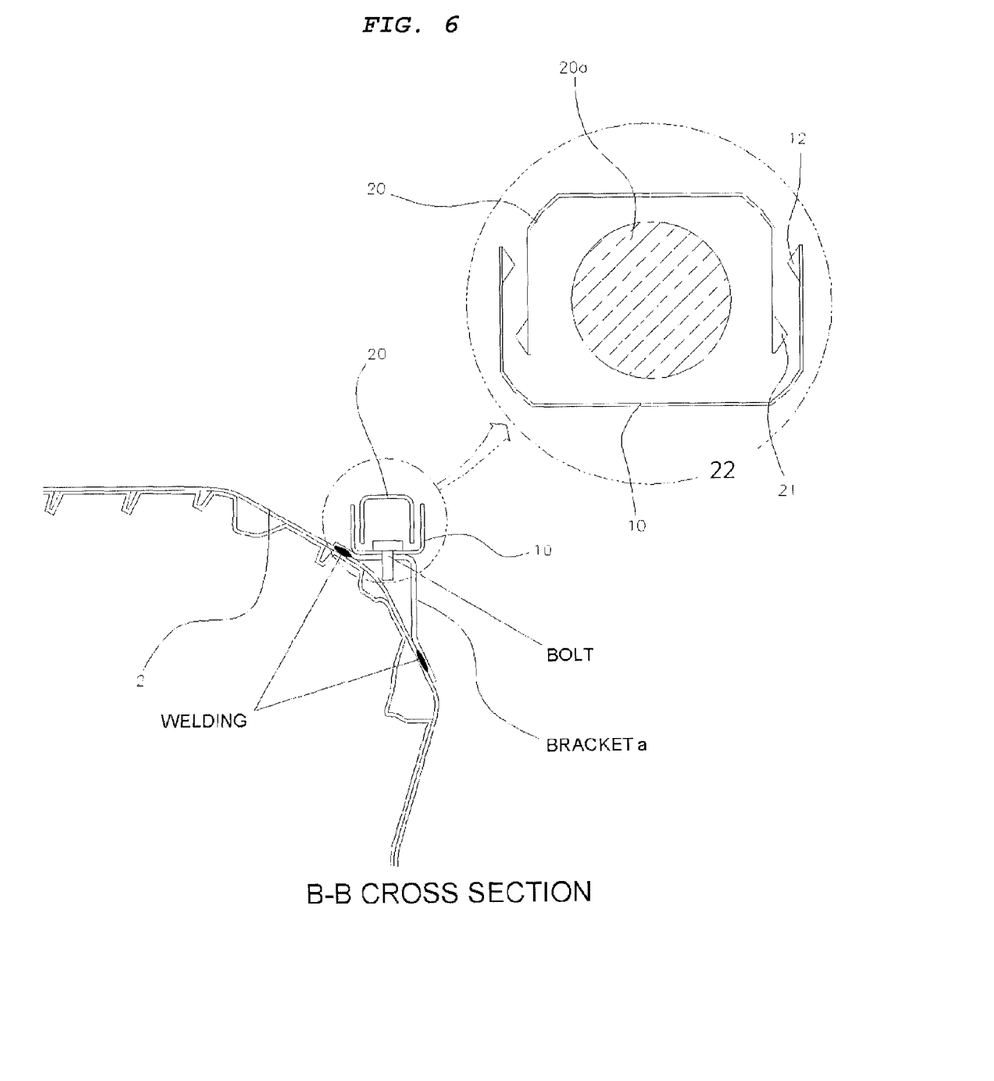
FIG. 6 is a view illustrating a cross section taken along line B-B of FIG. 2, and partially enlarged cross sections of the support panel and the covering member.
Figure 7:
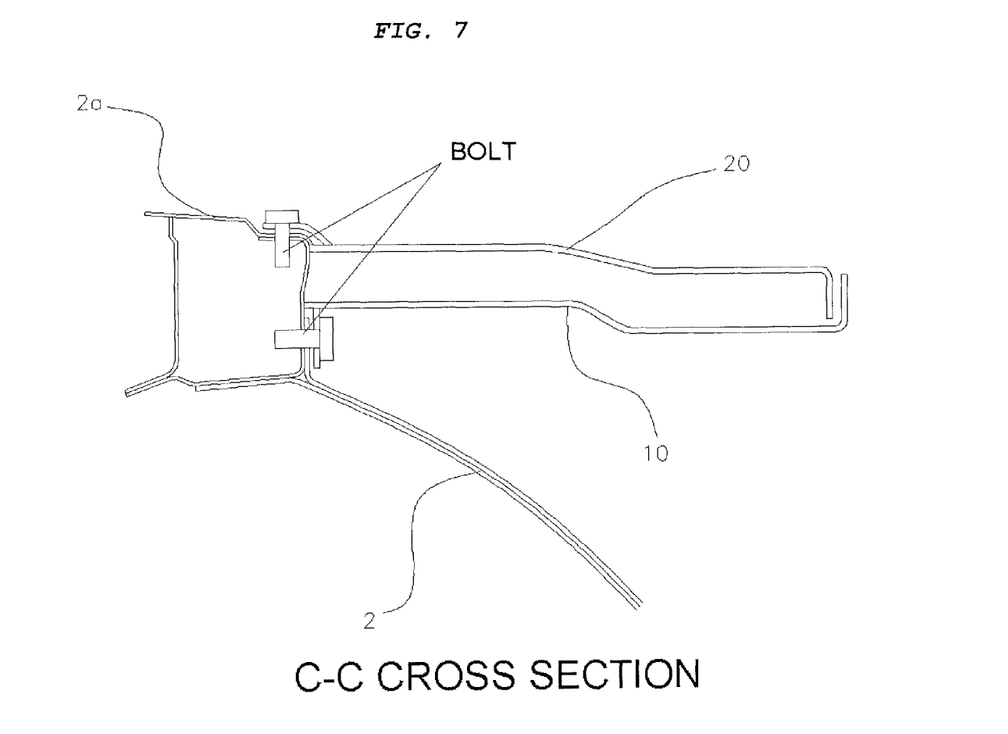
FIG. 7 is a view illustrating a cross section taken along line C-C of FIG. 2.
Figure 8:
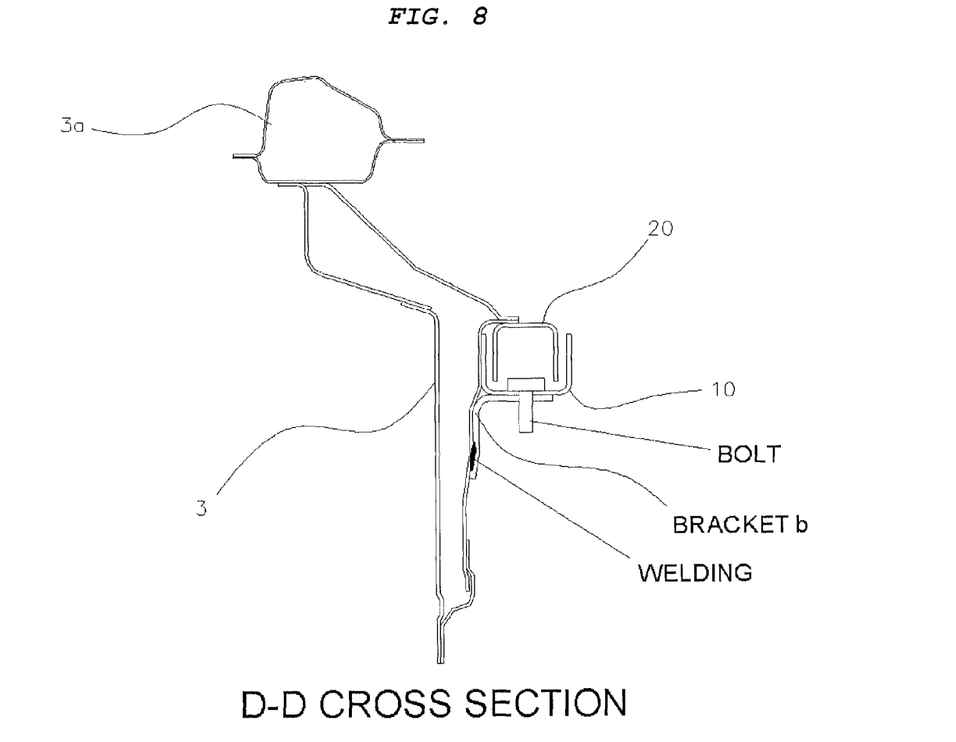
FIG. 8 is a view illustrating a cross section taken along line D-D of FIG. 2.

Meanwhile, FIGS. 5 to 8 illustrate more detail of exemplary embodiments of a structure in which the support panel 10 is coupled to the vehicle body. For example, as illustrated in FIG. 5, the covering member 20 and the support panel 10 are coupled to an upper end of the FEM 1 by bolts or the like. Further, as illustrated in FIG. 6, a bracket a is welded on the housing panel 2 of the shock absorber, and thereafter, the support panel 10 is seated on and fixed to the bracket a by a bolt or the like. As illustrated in FIG. 7 which illustrates a cross section of the enlarged portion of the covering member 20, an end of the enlarged portion is extended up to a fender apron 2a and engaged with the fender apron 2a by a bolt. As illustrated in FIG. 8, a bracket b is welded on a front side (a right side of the drawing) of the dash panel 3, and thereafter, the support panel 10, which constitutes the horizontal or transverse portion a of the housing member, is seated on and engaged with the bracket b by a bolt or the like. As described above, in the present invention, the housing member is horizontally disposed depending on a size and a position of the housing member, and the brackets (bracket a, and bracket b) on which the support panel may be seated are additionally mounted in order to improve mounting convenience.

The housing member according to the present invention has a structure in which the support panel 10, which is a lower structure, is securely connected to the FEM 1, the housing panel 2, and the dash panel 3, and the covering member 20, which is an upper structure, is coupled to an ESC tube, an air conditioner pipe, and the like as well as the wiring harness 20a, and mounted to the support panel 10, thereby improving rigidity of the vehicle body, and NVH performance.

In the structure of the present invention, the support panel 10 may be assembled to the vehicle body in a state in which the junction box 30 and the engine starting motor 40 are assembled in advance to the support panel 10, and the covering member 20 may also be coupled to the support panel 10 fixed to the vehicle body in a state in which the wiring harness 20a, the ESC tube, the air conditioner pipe, and the like, which are integrally manufactured, are assembled in advance to the covering member 20, thereby simplifying an assembly process.

That is, in a structure of the related art, a wiring harness, an air conditioner pipe, and an ESC tube, which are mounted in an engine room, are assembled by different processes, respectively, but in the structure of the engine room to which the present invention is applied, the aforementioned components which are integrally manufactured may be assembled by a single process in a state in which the aforementioned components are assembled to the covering member 20 that is an upper structure. In addition, the junction box 30 and the starting motor 40 are also assembled in advance to the support panel 10, and then may be assembled to the vehicle by a single process.

The housing member of the present invention forms a single closed cross-sectional structure by assembling the covering member 20 and the support panel 10. Accordingly, the housing member is connected to the FEM 1 at a front side of the vehicle, connected to the fender apron 2a and the housing panel 2 of the shock absorber in a vehicle width direction, and connected to the dash panel 3 and a cowl panel 3a at a rear side of the vehicle, thereby constituting a single annular reinforcing structure.

That is, since panels in the vicinity of the engine room are organically connected to each other, distortion of the vehicle, which may occur when the vehicle is cornering, may be suppressed by supporting left and right sides of the engine room. In the structure of the related art, multiple holes need to be punched in the dash panel, the FEM, and the like in order to mount the wiring harness, the ESC tube, and the like, which adversely affects NVH performance, but in the structure of the present invention, the number of punched holes may be greatly reduced, thereby improving NVH performance.

For convenience in explanation and accurate definition in the appended claims, the terms "left" or "right", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure of an engine room in which an FEM (front end module) is disposed at a front side, a dash panel is disposed at a rear side, and housing panels are disposed at both lateral sides between the FEM and the dash panel, respectively, the structure comprising:
   a housing member including:
      a transverse portion which is disposed adjacent to and substantially parallel to the dash panel; and
      longitudinal portions wherein each of the longitudinal portions is directly connected to a first end and a second end of the transverse portion respectively and is in a shape bent forward from the first and second ends of the transverse portion, respectively to extend toward the FEM, and wherein the longitudinal portions are disposed side-by-side with corresponding housing panels,
   wherein the housing member includes an open interior,
   wherein the housing member further includes:
      a support panel having a transverse portion and a longitudinal portion; and
      a covering member which has a transverse portion and a longitudinal portion and is seated on the support panel, and
   wherein the support panel is detachably coupled to the covering member.

2. The structure of claim 1, wherein:
   the support panel has a shape open upward and has a first protruding portion that protrudes on an inner circumferential surface of the support panel, and
   the covering member is seated inside the support panel, has a shape open downward, and has a second protruding portion that protrudes on an outer circumferential surface of the covering member, and
   wherein at least one of the support panel and the covering member is elastically deformable so that the second protruding portion is engaged to a portion of the support panel, while passing over the first protruding portion, the portion of the support panel being positioned beyond the first protruding portion.

3. The structure of claim 1, wherein both sides of the transverse portion of the support panel includes a box-shaped mounting portion respectively.

4. The structure of claim 3, wherein both sides of the covering member include enlarged portions respectively.

5. The structure of claim 4, wherein brackets on which the support panel is seated are mounted to the housing panels or the dash panel.

* * * * *